(12) United States Patent
Kim

(10) Patent No.: US 6,522,614 B1
(45) Date of Patent: Feb. 18, 2003

(54) TRAY EJECTION APPARATUS OF DISK DRIVE

(75) Inventor: Tae Sung Kim, Pyungtaek (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 09/688,843

(22) Filed: Oct. 17, 2000

(30) Foreign Application Priority Data

Oct. 23, 1999 (KR) .............................................. 99-46211

(51) Int. Cl.[7] .......................... G11B 33/02; G11B 21/07
(52) U.S. Cl. ...................................... 369/77.1; 369/223
(58) Field of Search ............................. 369/77.1, 75.2, 369/223

(56) References Cited

U.S. PATENT DOCUMENTS

| | | | |
|---|---|---|---|
| 5,500,844 A | * 3/1996 | Kim et al. | ................... 369/77.1 |
| 5,608,706 A | * 3/1997 | Park | ........................... 369/75.2 |
| 5,633,850 A | * 5/1997 | Park | ........................... 369/77.1 |
| 6,094,321 A | * 7/2000 | Pollard | ......................... 360/92 |
| 6,266,311 B1 | * 7/2001 | Song et al. | .................. 369/223 |

\* cited by examiner

Primary Examiner—David Davis
Assistant Examiner—Jennifer M Dolan
(74) Attorney, Agent, or Firm—Birch, Stewart, Kolasch & Birch, LLP

(57) ABSTRACT

A tray ejection apparatus for a disk drive which comprises a casing, a tray adapted to be movable into and out of said casing, a lead screw mounted for rotation on said tray, a pickup unit operatively engaged with said lead screw, driving means operatively connected to said lead screw for rotating said lead screw which in turn moves the pickup unit back and forth along said lead screw, a tray stopper extending from the casing, an ejection lever rotationally installed at the tray and in biased engagement with said tray stopper, and an ejection gear operatively engaged with said lead screw for rotation therewith, wherein upon the inputting of an ejection signal, the advance of the pickup unit is discontinued whereby the ejection gear engages the ejection lever, freeing it from the tray stopper and releasing the tray from the casing.

12 Claims, 4 Drawing Sheets

TRAY EJECTION APPARATUS OF DISK DRIVE

BACKGROUND OF THE INVENTION

1. Field of the Invention

The present invention relates to a disk drive, in particular to a tray ejection apparatus of a disk drive which is capable of ejecting a tray by using the driving force of a sled motor for transferring a pickup.

2. Description of the Prior Art

In general, a disk drive performs data reproducing/recording of a disk by using a pickup. It widely comprises a casing which is a mainframe of a drive, and a tray installed at the casing so as to be movable back and forth which performs the loading/unloading of the disk.

The general disk drive comprises a tray ejection apparatus which fixes the position of the tray, while data reproducing/recording is performed, after it is inserted inside of a casing, and ejects the tray from the casing when the fixed position of the tray is released after the disk reproducing/recording is finished.

The conventional tray ejection apparatus of the disk drive will now be described with reference to FIG. 1.

First, a solenoid 1 as the driving source and a driving plate 3 driven by the solenoid 1 are installed at the bottom surface of a tray T' where a disk is mounted.

Herein, the driving plate 3 is elastically supported by a spring 4 and the side of the spring is connected to an actuator 2 of the solenoid 1.

In addition, the spring 4 is connected between the tray T' and the driving plate 3 and provides elasticity to the driving plate 3.

Rotating slots 3A, 3B for rotating a connecting lever 6 and a bridging lever 10 are installed at the driving plate 3. Herein, the connecting lever 6 is installed at the bottom surface of the tray T' so as to be rotational, centering around a hinge shaft 6H, and is driven by the driving plate 3.

The connecting lever 6 includes a rotating protrusion 8 inserted into the rotating slot 3A of the driving plate 3 sliding along the rotating slot 3A, and a driving pin 9 for driving the bridging lever 10 formed at the end of the rotating protrusion 8.

The bridging lever 10 is installed at the bottom surface of the tray T' so as to be rotational, centering around a hinge shaft 10H, and is driven by the connecting lever 6.

An interlocking rib 11 for interlocking with the driving pin 9 of the connecting lever 6 is formed at the end of the bridging lever 10, and the hinge shaft 10H is inserted into the rotating slot 3B of the driving plate 3.

In addition, the bridging lever 10 and connecting lever 6 are elastically supported by the spring 7, 12 separately so as to be rotational, centering around the hinge shafts 6H and 10H, respectively.

A returning lever 13 for returning the connecting lever 6 and the bridging lever 10 driven by the solenoid 1 to their initial position is installed at the bottom surface of the tray T' adjacent to the bridging lever 10 so as to be rotational around the hinge shaft 13H. In addition, the returning lever 13 is elastically supported by a spring 9 (not shown) so as to be rotational around the hinge shaft 13H in a counter-clockwise direction.

A stopper 15 is formed at the front side of the casing C' for hanging and fixing the bridging lever 10 in order to prevent the tray T' from ejecting to the outside of the casing C' when the tray T' is inserted into the casing C' and when reproducing/recording data on a disk is performed.

In addition, the tray T' is elastically supported by an ejector spring 17 biased toward the outside of the casing C'; namely, in the tray ejection direction.

The non-described reference numeral 19 is a supporting protrusion formed the bottom surface of the tray T' for supporting the end of the springs 7, 12 which support the connection lever 6 and the bridging lever 10.

The operation of the conventional tray eject apparatus of the disk drive will now be described.

First, when an eject button is pushed by a user, a signal for operating the solenoid 1 is generated. The solenoid 1 is driven by the signal and the actuator 2 is projected to the rear side.

Likewise, when the actuator 2 of the solenoid 1 operates, the driving plate 3 connected to the actuator 2 is horizontally transferred to the rear side. After that, the rotating protrusion 8 of the bridging lever 6 inserted into the rotating slot 3A of the driving plate 3 slides along the rotating slot 3A by the movement of the driving plate 3, and the connecting lever 6 rotates around the hinge shaft 6H in the counter-clockwise direction.

As described above, when the connecting lever 6 rotates, the driving pin 9 of the connecting lever 6 pushes the interlocking rib 11 of the bridging lever 10, and the bridging lever 10 rotates around the hinge shaft 10H in counter-clockwise direction.

After that, when the bridging lever 10 escapes from the stopper 15, after rotating a certain amount in the counter-clockwise direction, the force restricting the tray T' is removed and, accordingly, the tray T' ejects to the outside of the casing C' to a certain degree by the ejector spring 17.

As described above, when the tray T' projects to the outside of the casing C' to a certain degree, the user can pull the tray T' by hand until it is completely removed to the outside of the casing C' where a disk can be unloaded from a tray or mounted in a tray T'.

Herein, when the tray T' completely projects to the outside of the casing C', the return lever 13 operates to make the solenoid 1 return to its initial position.

The return process of the solenoid 1 by the return lever 13 will now be described in detail.

When the tray T' is transferred toward the outside of the casing C', the left end portion of the return lever 13 hangs on the stopper 15, and the return lever 13 rotates around the hinge shaft 13H in a clock-wise direction.

As described above, when the return lever 13 rotates, the right end of the return lever 13 pushes the driving plate 3 to the front side, and the actuator 2 of the solenoid 1 moves into the solenoid 1 by the movement of the driving plate 3.

On the contrary, when the user pushes the tray T' into the casing C', the bridging lever 10 engages the stopper 15 and, accordingly, the position of the tray T' is fixed.

In more detail, the user loads a disk on the tray T' or unloads a disk mounted on the tray T', and pushes the tray T' into the casing C'.

When the tray T' is pushed into the casing C', the bridging lever 10 overcomes the elasticity of the spring 12 by being pushed by the stopper 15 and rotates a small amount in the counter-clockwise direction. The side of the bridging lever 10 in its rotated state is transferred in accordance with the stopper 15.

The tray T' is then pushed continually, so that when the end portion of the bridging lever 10 passes the stopper 15, the bridging lever 10 rotates around the hinge shaft 10H by the elasticity of the spring 12, and the end portion of the bridging lever 10 engages the inside of the stopper 15. Accordingly, the tray T' is received inside of the casing C'.

As described above, the solenoid 1, the driving plate 3, the bridging lever 10, the connecting lever 6 and the return lever 13 all represent the conventional tray ejection apparatus of the disk drive and are all installed at the bottom surface of the tray T', which is a moving unit. Accordingly, the construction complexity of the moving unit, and the electricity consumption required for transferring the moving unit increase due to the increase in load. Also, the assembly of the tray T' is very complicated because most of the parts are installed at the bottom surface of the tray T'.

In addition, the conventional tray ejection apparatus of a disk drive requires a solenoid 1 as an additional operation unit, and flexible cable for transmitting operational signals to the solenoid 1 installed between the casing C' and tray T' in order to connect them together. This causes an increase in the cost of parts and, accordingly, the manufacturing costs of the disk drive increases.

SUMMARY OF THE INVENTION

It is an object of the present invention to provide a tray ejection apparatus of a disk drive which is capable of ejecting the tray by using the driving force of a sled motor for transferring a pickup, thereby minimizing the construction parts required for the tray ejection apparatus.

The tray ejection apparatus of the disk drive of the present invention comprises a tray installed at the inside of a casing so as to be transferred back and forth for inserting into and extending from the casing. A driving unit is installed at the tray which provides the driving force for transferring a pickup. A transferring member is provided which transfers the pickup by rotating, using the force transmitted from the driving unit. A stopper member is protrusively formed at the front of the casing; a bridging member fixes and releases the tray through the bridging operation with the stopper member, and a releasing member is installed at the side of the transferring member so as to be interlocked with the transferring member which operates the bridging member in order to make the fixed tray position selectively releasable.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Hereinafter, the preferred embodiment of a tray eject apparatus of a disk drive according to the present invention will now be described in detail with reference to the accompanying drawings.

Figure 1:
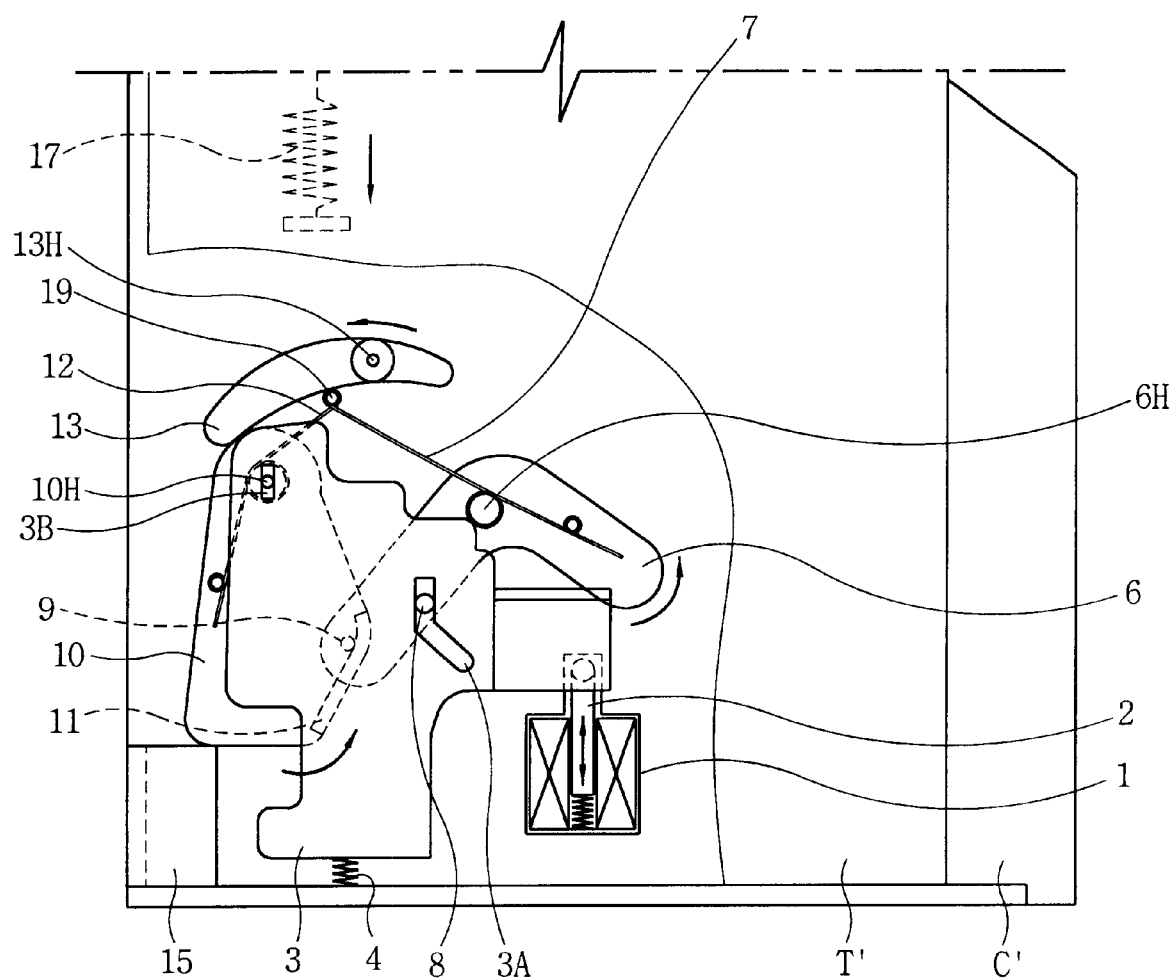
FIG. 1 is a schematic plan view illustrating the conventional tray ejection apparatus of a disk drive.
Figure 2:
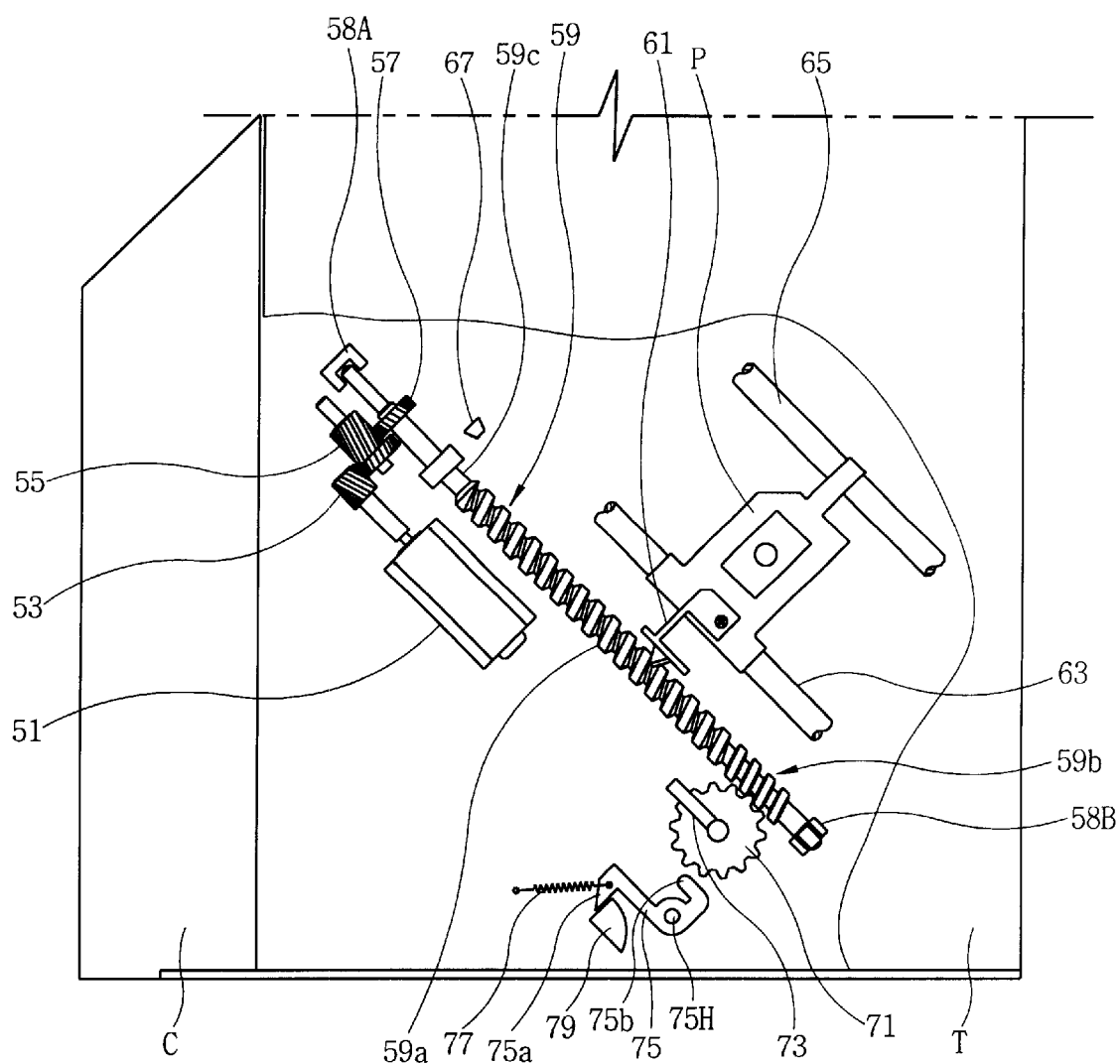
FIG. 2 is a plan view of the tray ejection apparatus of the disk drive of the present invention.
Figure 3:
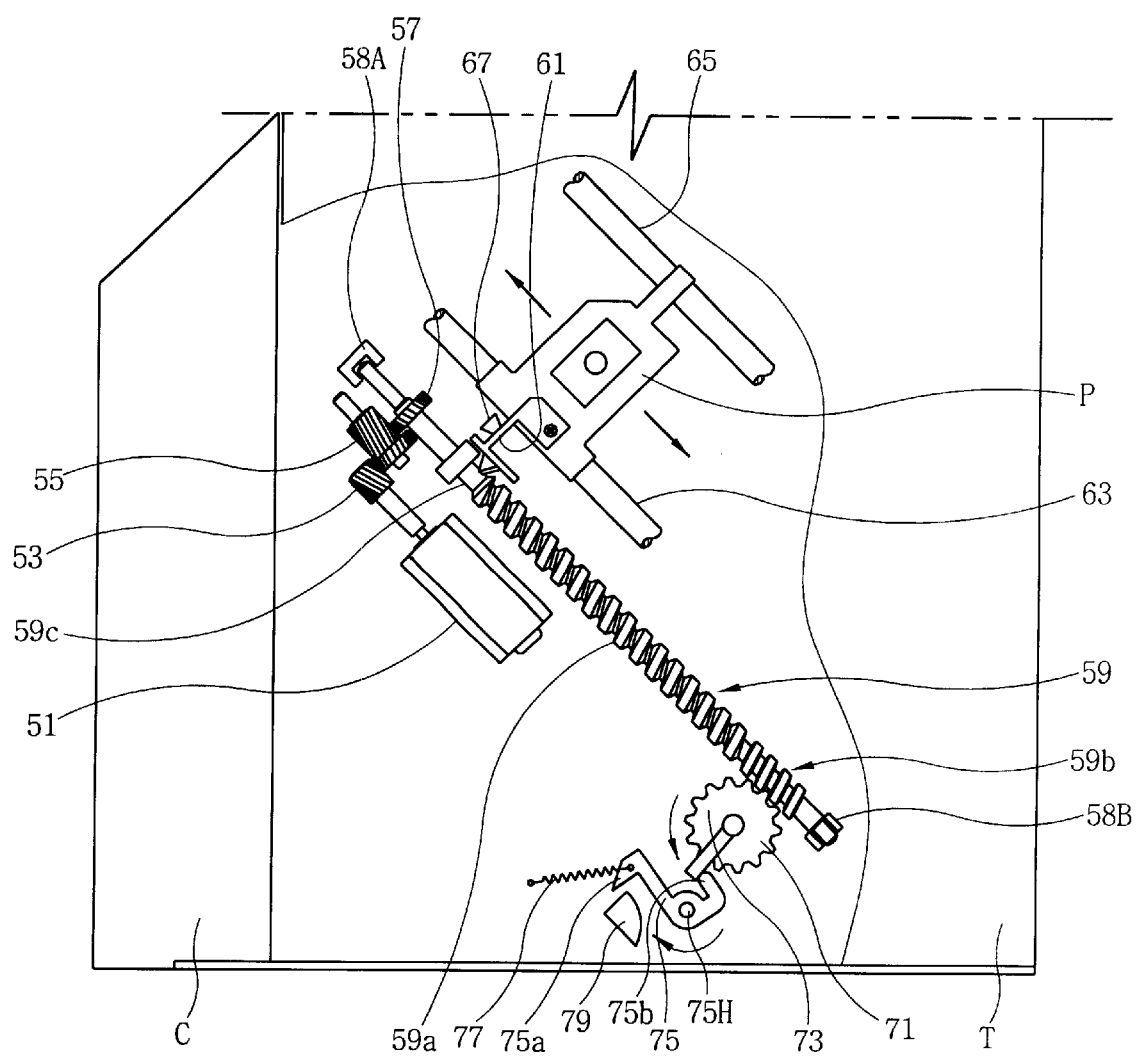
FIG. 3 is a plan view illustrating the operational state of the tray ejection apparatus of the disk drive of the present invention.

As depicted in FIGS. 2 and 3, in the tray ejection apparatus of the disk drive according to the present invention, when the tray T is inserted into a casing C, the position of the tray T is fixed so as not to extend to the outside of the casing C. However, when a user inputs an ejection signal in order to get the tray T to project to the outside of the casing C, the fixed state of the tray T position is released.

Herein, a sled motor 51 for providing the driving force in order to transfer a pickup unit P is installed at the lower side of the tray T. In addition, a lead screw 59, which is installed at the bottom surface of the tray T and is operatively connected to the sled motor, transfers the pickup unit P by rotation caused by the driving force received from the sled motor 51.

The sled motor 51 and lead screw are connected by a motor gear 53 attached to the sled motor 51, an idler gear 55 in rotating engagement with the motor gear 53, and a feed gear 57 in rotating engagement with the idler gear 55, which is connected to the lead screw 59. Thus the driving force of the sled motor 51 is transmitted to the lead screw 59.

The screw thread 59a of the lead screw 59 for transmitting the driving force through engagement with a guide feed 61 of a pickup unit P is formed at the outer circumferential surface of the lead screw 59, and both ends thereof are supported by supporting tips 58A, 58B.

A worm unit 59b is formed at one end of the lead screw 59, and a parallel groove unit 59c is provided at the other end thereof for restricting the further transferring of the pickup unit P. The parallel groove unit is formed at the other end of the lead screw 59, opposite from the worm unit 59b.

The pickup unit P is installed at the tray T so as to be transferred in a straight line in accordance with rotation of the lead screw 59 using the guide feed 61 which is engaged with the screw thread 59a of the lead screw 59. Herein, the transfer of the pickup unit P is guided by two guide shafts 63, 65 installed parallel to each other.

A pickup stopper 67 protrudes from the tray T to limit the transferring section of the guide feed 61, and at the same time generates a returning force to make the pickup unit P return to the screw thread 59a of the lead screw 59 after restricting the transfer of the pickup unit P within the parallel groove unit 59c of the lead screw 59.

An ejection gear 71 is rotationally engaged with the worm unit 59b of the lead screw 59. Thus the ejection gear 71 interlocks with the lead screw 59 because its gear unit is engaged with the worm unit 59b.

In addition, a protruding arm 73 is formed at the side of the ejection gear 71 so as to be rotational with the ejection gear 71.

An ejection lever 75 is installed at the tray T for fixing and releasing the position of the tray T through interlocking engagement with the ejection gear 71.

The ejection lever 75 is installed at the tray T to be rotational around a hinge shaft 75H and is elastically supported by an ejector spring 77 fixed at the tray T.

A tray stopper 79 protrudes at the front of the casing C in order to fix the position of the tray T by engaging the ejection lever 75 when the tray is inserted into the casing C.

A bridging end 75a is formed at the side of the ejection lever 75 which fixes the position of the tray T by engaging the tray stopper 79. A driving end 75b is formed at the other side of the ejection lever 75 for engagement with the protruding arm 73 in order to release the fixed state of the tray T by freeing the bridging end 75a due to the rotation of the ejection lever 75.

The ejection spring 77 elastically supports the ejection lever 75 to bias the ejection lever 75 for engagement of the bridging end 75a with the tray stopper 79.

Deceleration of the ejection gear 71 is established so as not to get the protrusion arm 73 interlocked with the ejection lever 75 in the pickup unit P transferring section.

The operation of the tray ejection apparatus of the disk drive of the present invention will now be described.

When the sled motor 51 operates, the driving force of the sled motor 51 is transmitted to the lead screw 59 through the motor gear 53, the idler gear 55 and the feed gear 57. When the lead screw 59 rotates, the guide feed 61 engages with the screw thread 59a of the lead screw 59 and the pickup unit P is transferred in a straight line and direction in accordance with the lead screw 59. The straight transferring of the pickup unit P is guided by two guide shafts 63, 65.

FIG. 2 illustrates the signal recording/reproducing state while the pickup unit is transferred.

As described above, while the pickup unit P is transferred by the lead screw 59, the ejection gear 71 is rotatably engaged with the rotation of the worm unit 59b of the lead screw 59 and reverse-rotates, i.e., rotates back and forth repeatedly within the worm gear section so as not to cause the protruding arm 73 to contact and drive the ejection lever 75.

When the eject signal is inputted by the user, the guide feed 61 is advanced into the parallel groove unit 59c of the lead screw 59 by the operation of the sled motor 51, and the pickup unit P is not further transferred.

The lead screw 59 rotates by the continuing operation of the sled motor 51, causing the ejection gear 71 to rotate in the counter-clockwise direction, whereby the protruding arm 73 of the ejection gear 71 engages the driving end 75b of the ejection lever 75 and pushes the driving end 75b.

When the ejection lever 75 is engaged by the protruding arm 73 of the ejection gear 71, the ejection lever 75 is caused to rotate clockwise around the hinge shaft 75H, overcoming the elastic bias of the ejector spring 77.

As described above, when the ejection lever 75 rotates clockwise, the bridging end 75a of the ejection lever 75, which is engaged with the tray stopper 79, escapes from the tray stopper 79, thereby releasing the fixed state of the tray T. The tray T is then projected to the outside of the casing C by the release of the spring bias of the tray relative to the casing. Likewise, when the tray is projected to the outside of the casing C, a disk can be loaded on the tray T, or a disk is unloaded from the tray T.

Meanwhile, when the ejection lever 75 is driven by the ejection gear 71, the guide feed 61, in the parallel groove unit 59c of the lead screw 59 is returned to the screw thread 59a of the lead screw 59 by the elasticity of the guide feed 61 itself and the operation of the pickup stopper 67.

Figure 4:
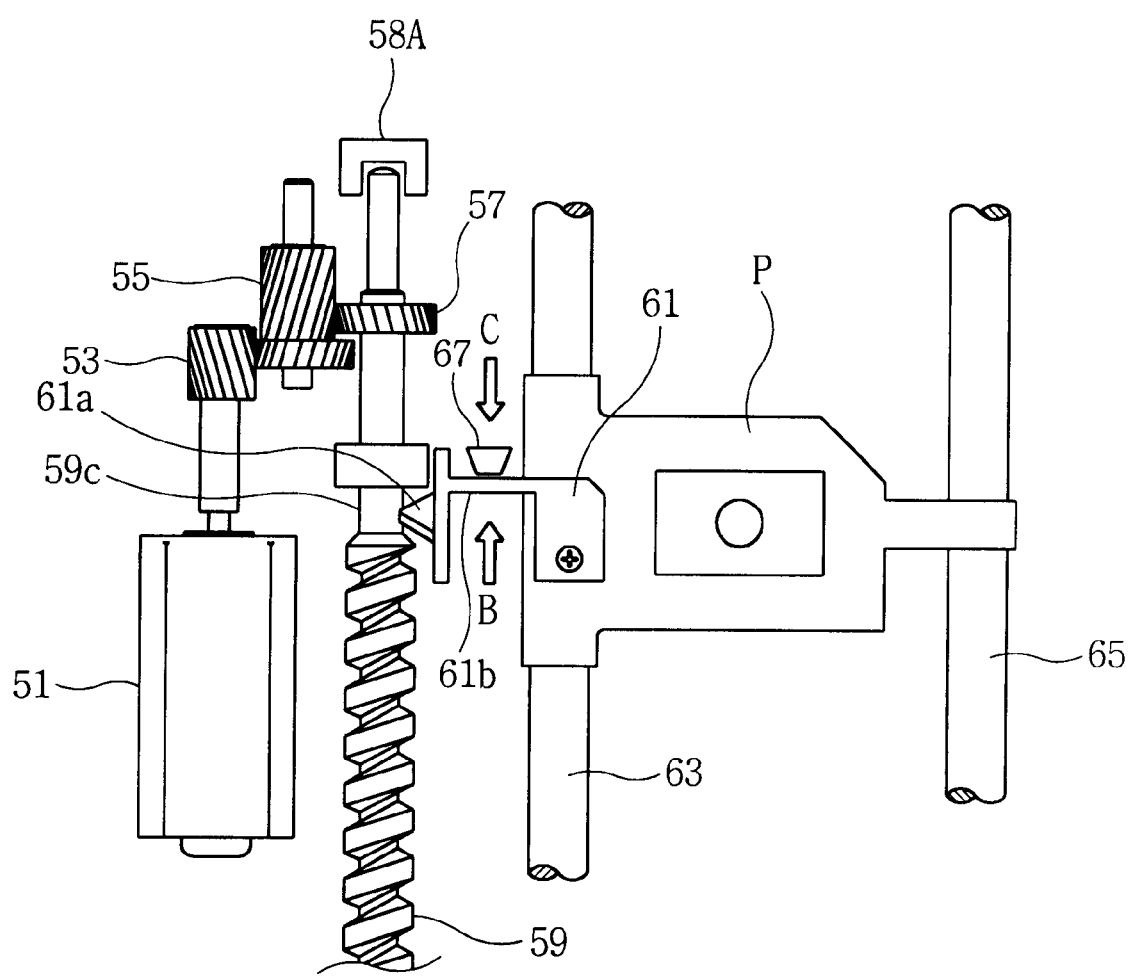
FIG. 4 is a plan view illustrating a guide feed returning to a screw thread of a lead screw of the present invention.

In other words, after a protrusion 61a of the guide feed 61 is advanced into the parallel groove unit 59c, the lead screw 59 rotates in the ejection direction, the guide feed 61 is transferred to the B direction of FIG. 4, and an elasticity unit 61b of the guide feed 61 contacts the pickup stopper 67.

The end of the screw thread 59a of the lead screw 59 continually pushes the protrusion 61a, whereby the elasticity unit 61b is elastically transformed, the guide feed 61 moves elastically toward the C direction of FIG. 4, and the protrusion 61a is always in contact with the end of the screw thread 59a.

After loading of the tray T, when the pickup unit P operates, the lead screw 59 rotates opposite to the ejection direction, the protrusion 61a is always in contact with the end of the screw thread 59a by the elasticity force of the elasticity unit 61b, the protrusion 61a easily engages the screw thread 59a, and the pickup unit P is transferred in accordance with transferring of the protrusion 61a by the screw thread 59a.

As described above, the tray ejection apparatus of the disk drive of the present invention is capable of minimizing construction parts of the disk drive by ejecting the tray T using the sled motor 51 which transfers the pickup unit P as a driving unit.

Accordingly, since an additional driving unit is not required, the present invention can provide a simplified assembly process with a decrease in manufacturing cost.

In addition, parts installed at the tray T as a moving unit decreases; that is, the structure of the moving unit can be simplified and the load can be reduced. Accordingly, the operation efficiency and credibility is increased, and the quantity of the electricity used for transferring of the driving unit decreases.

The present invention may be embodied in several forms without departing from the spirit or essential characteristics thereof. It should also be understood that the above-described embodiments are not limited by any of the details of the foregoing description, unless otherwise specified, but rather should be construed broadly within the spirit and scope of the invention, as defined in the appended claims, and therefore all changes and modifications that fall within the metes and bounds of the claims, or equivalents of such metes and bounds are therefore intended to be embraced by the appended claims.

What is claimed is:

1. A tray ejection apparatus for a disk drive which comprises a casing, a tray adapted to be movable into and out of said casing, a lead screw mounted for rotation on said tray, a pickup unit operatively engaged with said lead screw, driving means operatively connected to said lead screw for rotating said lead screw which in turn moves the pickup unit back and forth along said lead screw, a tray stopper extending from the casing, an ejection lever rotationally installed at the tray and in biased engagement with said tray stopper, and an ejection gear operatively engaged with said lead screw for rotation therewith, wherein upon the inputting of an ejection signal, the advance of the pickup unit is discontinued whereby the ejection gear engages the ejection lever, freeing it from the tray stopper and releasing the tray from the casing, wherein a parallel groove section is formed at the end of the lead screw in order to restrict the advance of the pickup unit.

2. The tray ejection apparatus of claim 1, wherein the tray is held within the casing by a spring.

3. The tray ejection apparatus of claim 1, wherein the ejection gear contains a protruding arm which is adapted to engage the ejection lever.

4. The tray ejection apparatus of claim 1, wherein the lead screw has a screw threaded outer circumferential surface for moving the pickup unit with a worm section for driving the ejection gear.

5. The tray ejection apparatus according to claim 1, wherein a pickup stopper is provided for restricting the transferring of the pickup unit within the parallel groove portion of the lead screw, said pickup stopper generating a return force for making the pickup unit return to the screw thread of the lead screw.

6. A tray ejection apparatus for a disk drive which comprises a casing, a tray adapted to be movable into and out of said casing, a lead screw mounted for rotation on said tray, a pickup unit operatively engaged with said lead screw, driving means operatively connected to said lead screw for rotating said lead screw which in turn moves the pickup unit back and forth along said lead screw, a tray stopper extending from the casing, an ejection lever rotationally installed at the tray and in biased engagement with said tray stopper, and an ejection gear operatively engaged with said lead screw for rotation therewith, wherein upon the inputting of an ejection signal, the advance of the pickup unit is discontinued whereby the ejection gear engages the ejection lever, freeing it from the tray stopper and releasing the tray from the casing, wherein the ejection gear contains a protruding arm which is adapted to engage the ejection lever.

7. The tray ejection apparatus of claim 6, wherein the tray is held within the casing by a spring.

8. The tray ejection apparatus of claim 6, wherein the lead screw has a screw threaded outer circumferential surface for moving the pickup unit with a worm section for driving the ejection gear.

9. The tray ejection apparatus according to claim 6, wherein a parallel groove section is formed at the end of the lead screw in order to restrict the advance of the pickup unit, and wherein a pickup stopper is provided for restricting the transferring of the pickup unit within the parallel groove portion of the lead screw, said pickup stopper generating a return force for making the pickup unit return to the screw thread of the lead screw.

10. A tray ejection apparatus for a disk drive which comprises a casing, a tray adapted to be movable into and out of said casing, a lead screw mounted for rotation on said tray, a pickup unit operatively engaged with said lead screw, driving means operatively connected to said lead screw for rotating said lead screw which in turn moves the pickup unit back and forth along said lead screw, a tray stopper extending from the casing, an ejection lever rotationally installed at the tray and in biased engagement with said tray stopper, and an ejection gear operatively engaged with said lead screw for rotation therewith, wherein upon the inputting of an ejection signal, the advance of the pickup unit is discontinued whereby the ejection gear engages the ejection lever, freeing it from the tray stopper and releasing the tray from the casing, wherein the lead screw has a screw threaded outer circumferential surface for moving the pickup unit with a worm section for driving the ejection gear.

11. The tray ejection apparatus of claim 10 wherein the tray is held within the casing by a spring.

12. The tray ejection apparatus according to claim 10 wherein a parallel groove section is formed at the end of the lead screw in order to restrict the advance of the pickup unit, and wherein a pickup stopper is provided for restricting the transferring of the pickup unit within the parallel groove portion of the lead screw, said pickup stopper generating a return force for making the pickup unit return to the screw thread of the lead screw.

* * * * *